Patented Aug. 1, 1933

1,920,697

UNITED STATES PATENT OFFICE 1,920,697

PHOSPHORIC ACID SALT OF β-BROMETHYL-TRIMETHYL-AMMONIUM-THEOBROMINE-1-ACETATE AND PROCESS OF PRODUCING THE SAME

Heinrich Hornstein, Berlin-Halensee, Germany, assignor to Hermann Koch, Berlin, Germany No Drawing. Application May 19, 1932, Serial No. 612,388, and in Germany January 25, 1932

2 Claims. (Cl. 260—34)

This invention relates to a new composition of matter and to the process of producing the same. Object of the present invention is the phosphoric acid salt or β-bromethyl-trimethyl-ammonium-theobromine-1-acetate. The β-bromethyltrimethyl-ammonium-theobromine-1-acetate

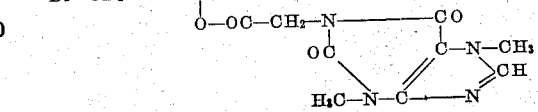

is a salt having strongly hygroscopic properties which impede its employment as a commercial preparation.

It has now been ascertained in accordance with the present invention that, by treating the said salt with phosphoric acid, a compound is obtained that is completely stable in air, convenient to manipulate and unaccompanied by difficulties during storage. According to the experiments performed, the action of the phosphoric acid is based on the formation of a new compound, which forms well-defined crystals and is obtained with an approximately quantitative yield. That phosphoric acid should act in this manner is surprising, since it would be expected that the phosphoric acid would precipitate theobromine-1-acetic acid, and that the readily soluble β-bromethyl-trimethyl-ammonium-phosphate would be formed. The new compound has been proved by its physical and chemical properties to be a chemical entity, and the analysis shows that it contains one theobromine-1-acetic acid residue and one molecule of phosphoric acid to one β-bromethyltrimethylammonium radicle.

A typical method of preparing the compound consists in treating 1 molecule of β-bromethyl-trimethylammonium-theobromine-1-acetate—preferably in the form of a solution or suspension in an organic solvent—with 1 molecule of phosphoric acid, preferably in solution in an organic solvent. The new compound crystallizes, almost instantaneously, in well defined massive needles, and can be further purified by recrystallization from ethyl or methyl alcohol. It contains 15.9% of bromine and 18.9% of $PO_4$, corresponding to a molecular weight of 502.

Example I 247 grms. of β-bromethyltrimethylammonium-bromide (Jahresbericht der Chemie 1858, p. 338) are dissolved in about a tenfold quantity of methyl alcohol, and 346 grms. of silver theobromine-1-acetate (Ger. Pat. 524,102) are stirred into the solution at a gentle heat. After removing the precipitated silver bromide by filtration, a solution of β-bromethyl-trimethyl-ammonium-theobromine-1-acetate is obtained.

98 grms. of anhydrous phosphoric acid are dissolved, with cooling, in about 200 grms. of methyl alcohol, and this solution is stirred into the one above. The new compound separates out almost immediately, and, after settling down, is filtered at the pump, washed with methyl alcohol and, if desired, recrystallized from ethyl or methyl alcohol.

Example II 404 grms. of β-bromethyl-trimethylammonium-theobromine-1-acetate (prepared, as set forth in Example 1, par. 1 by double decomposition and concentrating the resulting methanolic solution or precipitating same with ether) are suspended in about 2 litres of acetone, 98 grms. of anhydrous phosphoric acid (also dissolved in acetone) being vigorously stirred into said suspension. The whole sets, after a short time, to a crystalline pulp of the compound, which is purified in the manner hereinbefore described.

I claim:—

1. A process for the production of the phosphoric acid salt of β-bromethyltrimethyl-ammonium-theobromine-1-acetate, which comprises treating β-bromethyl-trimethyl-ammonium-theobromine-1-acetate with phosphoric acid.

2. The air stable, easily handled and stored phosphoric acid salt of β-bromethyltrimethyl-ammonium-theobromine-1-acetate.

HEINRICH HORNSTEIN.